(12) United States Patent
Chou (10) Patent No.: US 10,527,031 B2
(45) Date of Patent: Jan. 7, 2020

(54) AIR COMPRESSOR

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 204 days.

(21) Appl. No.: 15/405,307

(22) Filed: Jan. 13, 2017

(65) Prior Publication Data

US 2017/0204844 A1 Jul. 20, 2017

(30) Foreign Application Priority Data

Jan. 20, 2016 (TW) .............................. 105101784 A (51) Int. Cl.
| | | |
|---|---|---|
| *F04B 39/10* | (2006.01) | |
| *F16K 15/14* | (2006.01) | |
| *F16K 15/03* | (2006.01) | |
| *F04B 39/12* | (2006.01) | |
| *F04B 41/02* | (2006.01) | |

(52) U.S. Cl.
CPC ........ *F04B 39/1073* (2013.01); *F04B 39/125* (2013.01); *F04B 41/02* (2013.01); *F16K 15/03* (2013.01); *F16K 15/14* (2013.01)

(58) Field of Classification Search
CPC ...... F04B 39/10; F04B 39/1073; F04B 39/12; F04B 39/125; F04B 39/104; F04B 53/10; F04B 53/22; F16K 15/14; F16K 15/148; F16K 15/03; F16K 15/033; F16K 15/035
USPC .......... 417/569, 570; 137/511, 512.1, 512.15
See application file for complete search history.

(56) References Cited

U.S. PATENT DOCUMENTS

| | | | | |
|---|---|---|---|---|
| 4,565,507 A | * | 1/1986 | Reimers .............. | F04B 39/1073 137/512.15 |
| 6,575,935 B1 | * | 6/2003 | Oliver ................. | A61M 5/1483 128/DIG. 12 |
| 2012/0305666 A1 | * | 12/2012 | Harwood ........... | F02M 51/0603 239/102.2 |

* cited by examiner

*Primary Examiner* — Philip E Stimpert (57) ABSTRACT

An improved air compressor includes a cylinder fitted with a piston body, a main frame for mounting a motor, and an air storage container. The cylinder defines a plurality of exit holes regulated by a control mechanism including a resilient sheet having a root and a plurality branches corresponding to the exit holes. The root and branches of the resilient sheet are individually attached to a top wall of the cylinder at separate points, so that each of the branches can be individually moved by the compressed air produced in the cylinder to open or close the corresponding exit hole without affecting movements of the other branches, so that the piston body can conduct reciprocating motion more smoothly, and thus the performance of the air compressor can be increased.

13 Claims, 13 Drawing Sheets

AIR COMPRESSOR

TECHNICAL FIELD OF THE INVENTION

The present invention relates to an air compressor and, more particularly, to an improved air compressor which includes a cylinder being fitted with a piston body and defining a plurality of exit holes regulated by a control mechanism that includes a resilient sheet, wherein the resilient sheet has a root and a plurality of branches extending from the root and corresponding to the exit holes, the root and branches being attached to a top wall of the cylinder at separate points, so that each of the branches of the resilient sheet can be moved individually by compressed air without affecting movements of the other branches; therefore, the piston body can conduct reciprocating motion more smoothly, and thus the performance of the air compressor can be increased.

DESCRIPTION OF THE PRIOR ART

Currently, an air compressor basically has a cylinder which allows a piston body to conduct reciprocating motion therein to produce compressed air which can overcome a valve mechanism, so that the compressed air can flow through an exit hole of the cylinder to enter the inner space of an air storage container or an air tank. The air storage container is provided with outlets for delivering the compressed air to an object to be inflated.

In conventional air compressors, there is only one exit hole defined at the cylinder for communicating with the air storage container. The exit hole of the cylinder is controlled by a valve mechanism, which generally includes a plug and a compression spring, so that the exit hole can be opened or closed properly according to the pressure of the compressed air. In operation, the compressed air produced in the cylinder can overcome the compressive force of the compression spring to enter the inner space of the air compressor. However, the compressed air stored in the air storage container can exert a back force on the plug, thus restraining the plug from being moved away from the exit hole. As a result, the piston body, which conducts reciprocating motion in relation to the cylinder, will be subjected to greater resistance. Therefore, the piston body may not move smoothly in relation to the cylinder, and thus the speed of inflating an object will become slow. Furthermore, the motor of the air compressor may become too hot, thus decreasing the performance of the motor. Even worse, the motor may be under the risk of burning out.

In view of the foregoing, the applicant intends to develop an improved air compressor which can solve the shortcomings of conventional air compressors.

SUMMARY OF THE INVENTION

One object of the present invention is to provide an improved air compressor, wherein a cylinder thereof defines a plurality of exit holes, through which a large amount of compressed air produced in the cylinder may enter an air storage container in a short time.

Another object of the present invention is to provide an improved air compressor, wherein a cylinder thereof is fitted with a piston body and defines a plurality of exit holes regulated by a control mechanism to be opened or closed. The control mechanism includes a resilient sheet having a root and a plurality of branches extending from the root and corresponding to the exit holes, wherein the root and branches of the resilient sheet are attached to a top wall of the cylinder at separate points, whereby each of the branches of the resilient sheet can be moved individually by compressed air without affecting movements of the other branches, so that the piston body can conduct reciprocating motion more smoothly, and thus the performance of the air compressor and the speed of inflating an object can be increased.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
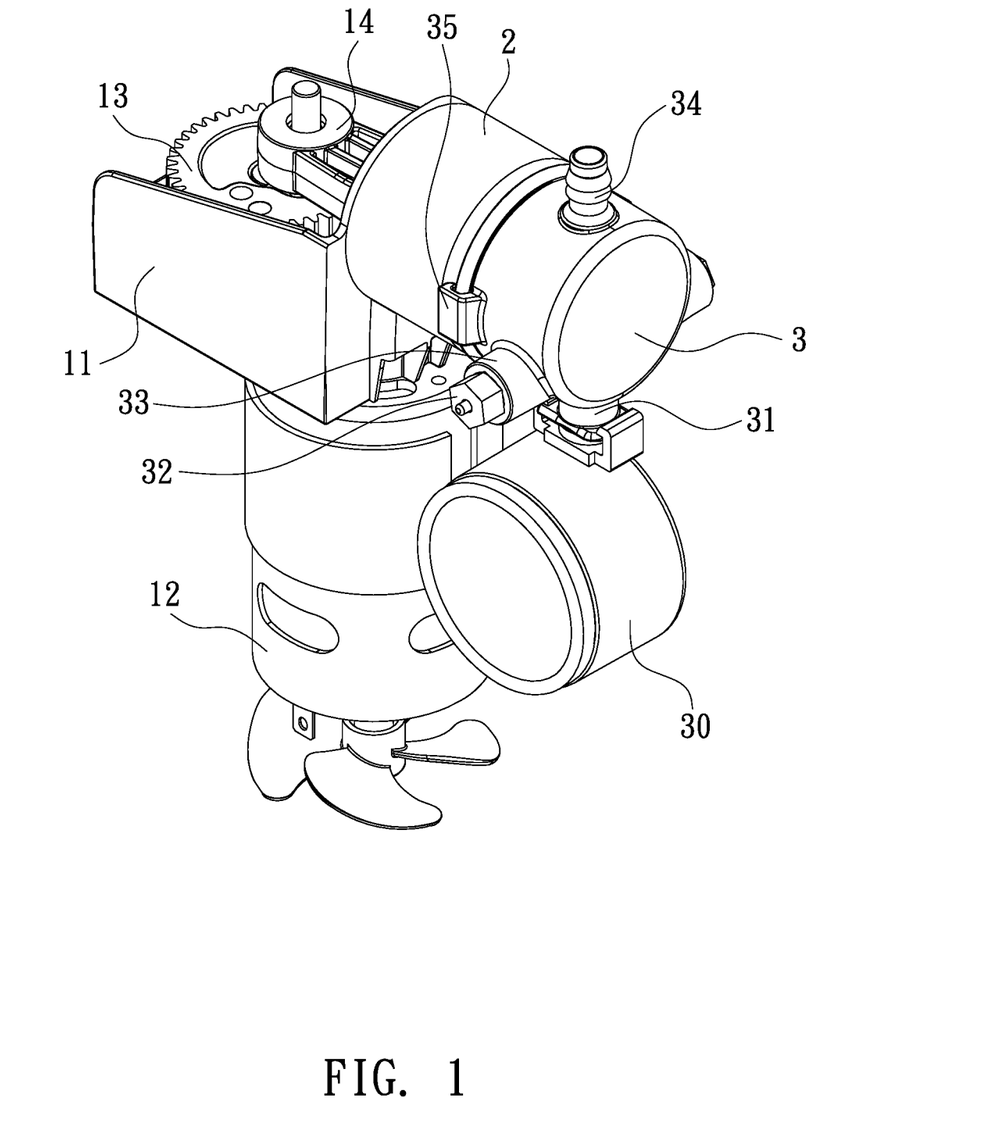
FIG. 1 shows a 3-dimensional view of an air compressor according to one embodiment of the present invention.
Figure 2:
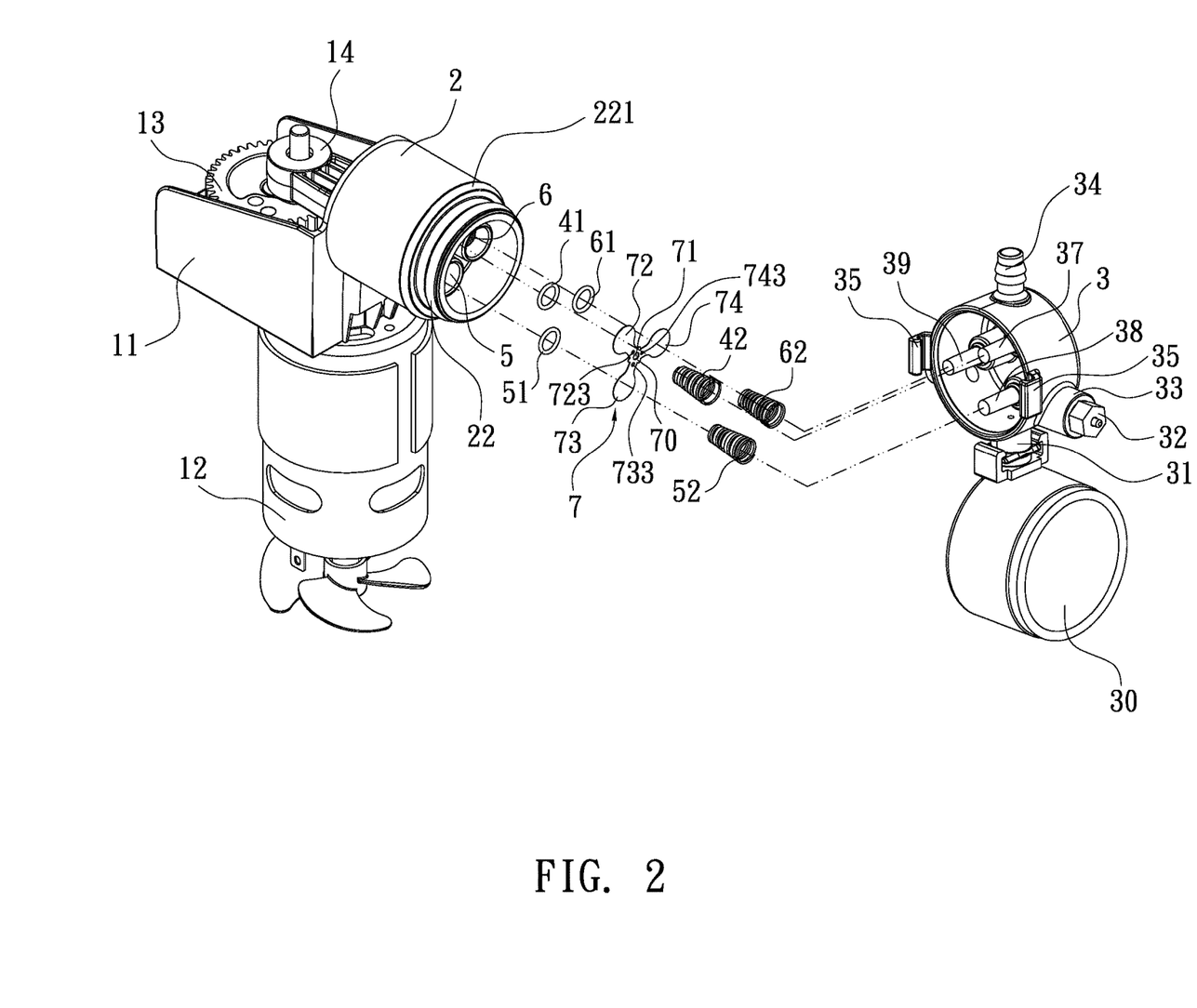
FIG. 2 shows an exploded view of the air compressor.
Figure 3:
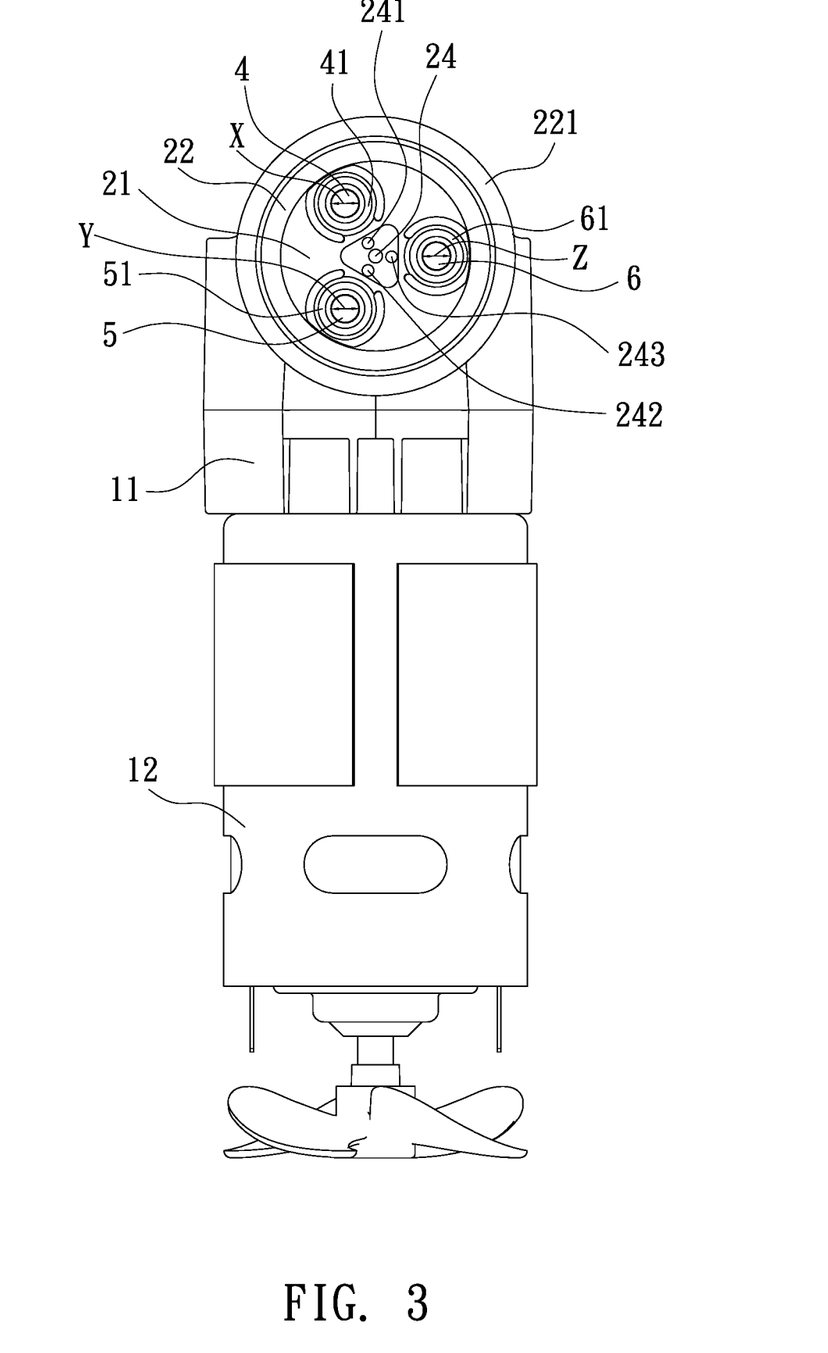
FIG. 3 shows a plan view of the air compressor, wherein a plurality of equal-diameter exit holes defined at a cylinder thereof are revealed.
Figure 4:
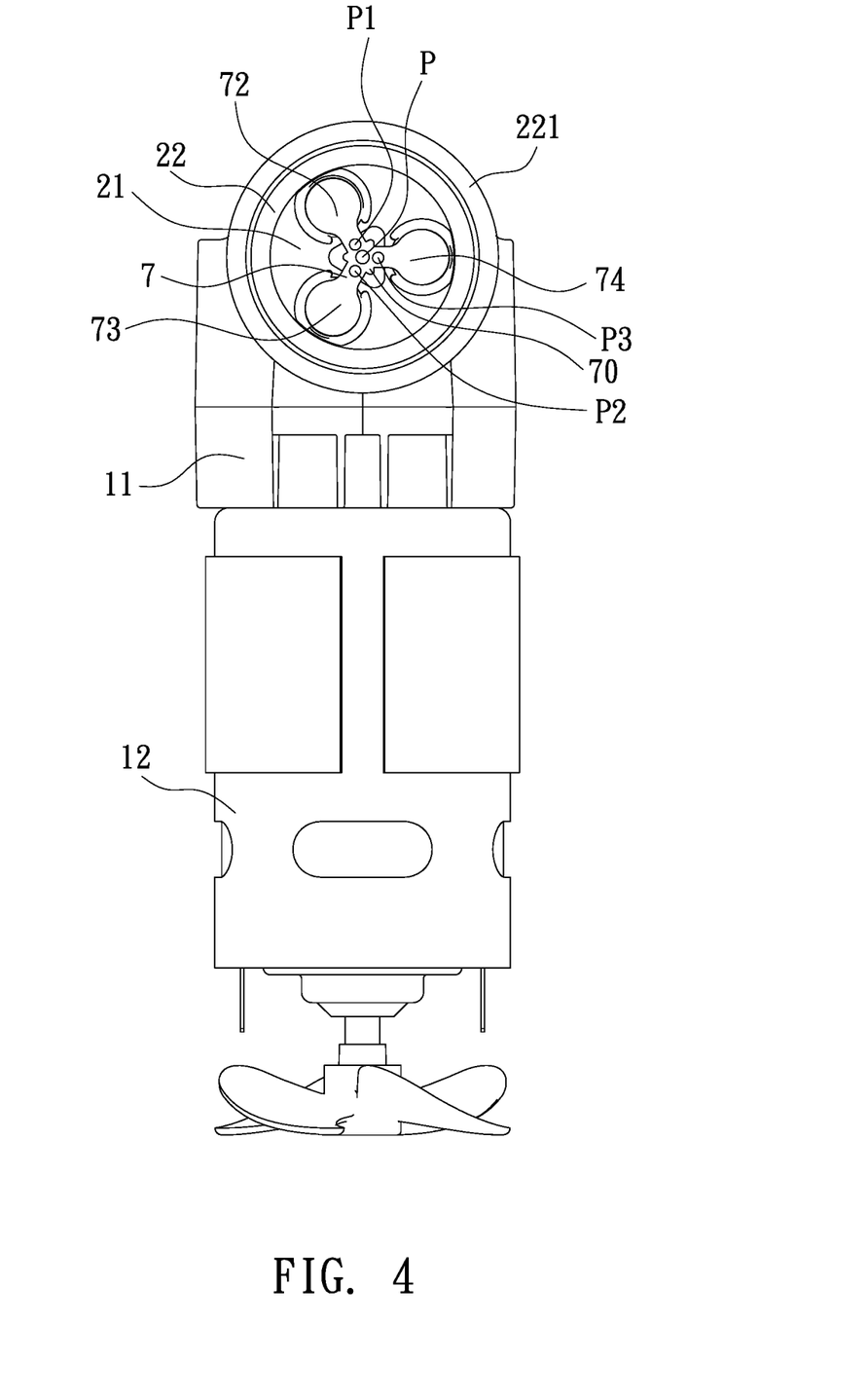
FIG. 4 shows a plan view of the air compressor, wherein a resilient sheet being used to seal the exit holes is revealed.

Referring to FIGS. 1 and 2, an improved air compressor according to one embodiment of the present invention is shown, which generally comprises a main frame 11 for mounting a motor 12, and a cylinder 2 fitted with a piston body 14. The motor 12 can rotate a gear 13 to drive the piston body 14 to conduct reciprocating motion in relation to the cylinder 2 so as to produce compressed air, which can enter an air storage container 3 provided with one or more outlets, wherein, for example, the outlet 31 can be connected with a pressure gauge 30; the outlet 33 can be connected with a relief valve 32; the outlet 34 can be connected with a hose (not shown) for inflating an object.

Figure 5:
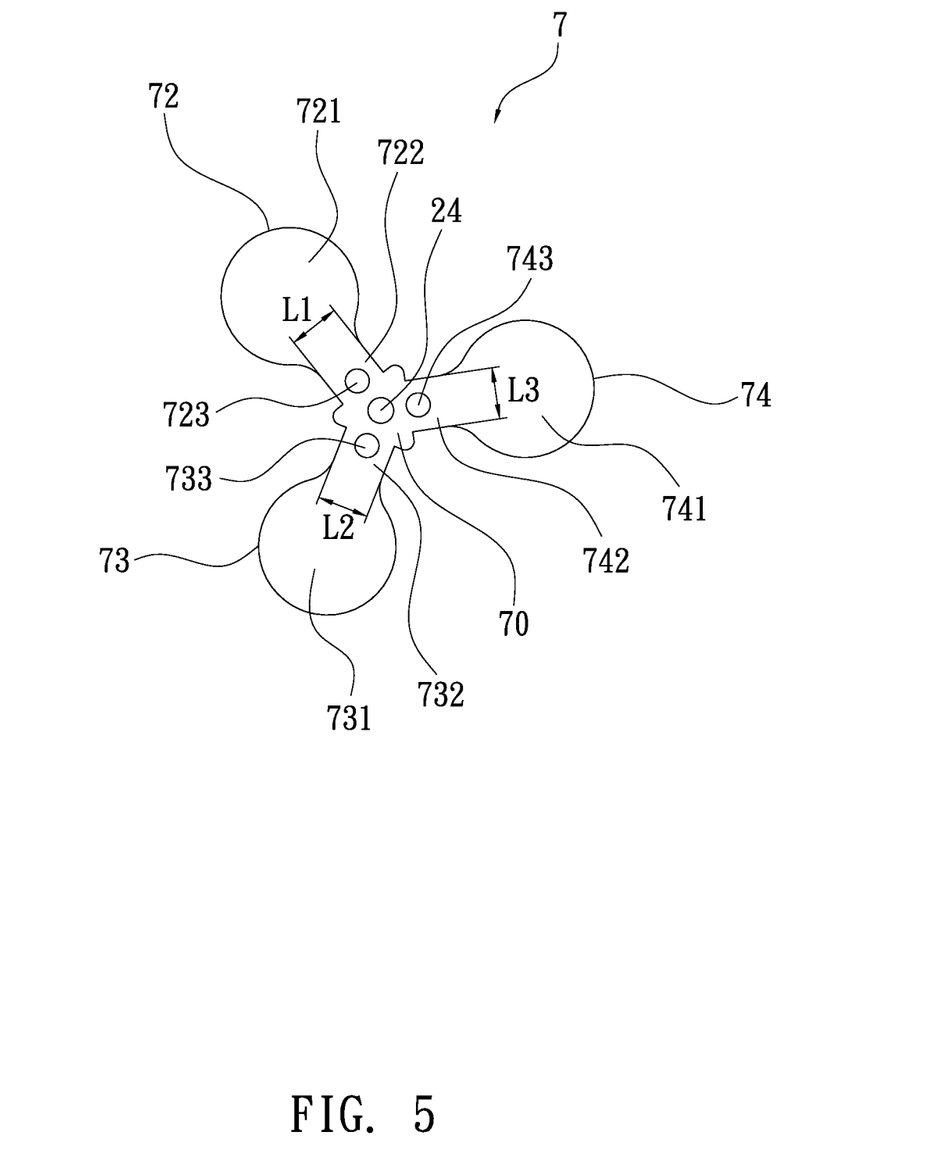
FIG. 5 shows an enlarged plan view of the resilient sheet being used in the present invention.

As shown in FIGS. 2 through 8, the cylinder of the present invention is designed in a way different from conventional technology, wherein the cylinder 2 defines a plurality of exit holes at its top wall 21, and the cylinder 2 is formed integrally with the main frame 11 by plastic material. In this embodiment, the exit hole 4 is defined to have a diameter of X, the exit hole 5 is defined to have a diameter of Y, and the exit hole 6 is defined to have a diameter of Z, wherein X=Y=Z is fulfilled (see FIG. 3); namely, the exit holes 4, 5, 6 are equal in diameter. The exit holes 4, 5, 6 are regulated by a control mechanism to be opened or closed, wherein the control mechanism includes O-rings 41, 51, 61, compression springs 42, 52, 62, and a resilient sheet 7. The O-rings 41, 51, 61 can be placed around the exit holes 4, 5, 6 respectively. The resilient sheet 7 has a root 70 and three branches including a first branch 72, a second branch 73, and a third branch 74, which correspond to the exit holes 4, 5, 6 respectively. The root 70 of the resilient sheet 7, which is substantially located at a center of the resilient sheet 7, defines a central positioning hole 71. The three branches 72, 73, 74 extend from the root 70 to appear as a star configuration. The first branch 72 has a first neck portion 722 extending from the root 70 and terminating at a first leaf 721, and defines a first positioning hole 723 at one end of the first neck portion 722 close to the root 70. The second branch 73 has a second neck portion 732 extending from the root 70 and terminating at a second leaf 731, and defines a second positioning hole 733 at one end of the second neck portion 732 close to the root 70. The third branch 74 has a third neck portion 742 extending from the root 70 and terminating at a third leaf 741, and defines a third positioning hole 743 at one end of the third neck portion 742 close to the root 70. Furthermore, as shown in FIG. 5, the first neck portion 722 is configured to have a predetermined width L1 being transverse to the extending direction of the first branch 72; the second neck portion 732 is configured to have a predetermined width L2 being transverse to the extending direction of the second branch 73; the third neck portion 742 is configured to have a predetermined width L3 being transverse to the extending direction of the third branch 74; wherein L1=L2=L3 is fulfilled. The central positioning hole 71 of the root 70 can be fitted over a main boss 24 provided at the top wall 21 of the cylinder 2, wherein the main boss 24 is located at a central point (P). The first positioning hole 723 of the first branch 72 can be fitted over a first boss 241 provided at the top wall 21 of the cylinder 2, wherein the first boss 241 is located at a peripheral point (P1) close to the central point (P). The second positioning hole 733 of the second branch 73 can be fitted over a second boss 242 provided at the top wall 21 of the cylinder 2, wherein the second boss 242 is located at a peripheral point (P2) close to the central point (P). The third positioning hole 743 of the third branch 74 can be fitted over a third boss 243 provided at the top wall 21 of the cylinder 2, wherein the third boss 243 is located at a peripheral point (P3) close to the central point (P). The first, second and third leaves 721, 731, 741 of the branches are configured to have sizes sufficient for covering the exit holes 4, 5, 6, and thus can seal the exit holes. Thus, the branches 72, 73, 74 are attached to the top wall 21 of the cylinder 2 at separate points (P1, P2, P3), and placed in tight contact with the O-rings 41, 51, 61 to seal the exit holes 4, 5, 6 (see FIGS. 2 and 4). The air storage container 3 is provided with two opposite coupling means 35 at its outer surface (see FIG. 9). The cylinder 2 has a tubular projection 22 formed on the top wall 21. The tubular projection 22 is provided at its outer surface with a circular flange 221 and defines an annular groove 222 between the circular flange 221 and the top wall 21 for allowing the two coupling means 35 of the air storage container 3 to be inserted into the annular groove 222 and engaged with the circular flange 221. The air storage container 3 is provided at an inner surface thereof with three columns 37, 38, 39 corresponding to the branches 72, 73, 74 of the resilient sheet 7. Each of the compression springs 42, 52, 62 has one end forcing against one of the branches 72, 73, 74 of the resilient sheet 7, and has another end being fitted at one end of one of the columns 37, 38, 39, wherein the columns 37, 38, 39 are respectively located above the branches 72, 73, 74 of the resilient sheet 7 at predetermined heights to limit the movements of the branches 72, 73, 74 so that the resilient sheet 7 can be prevented from elastic fatigue. As such, the compression springs 42, 52, 62 can urge the branches 72, 73, 74 of the resilient sheet 7 against the O-rings 41, 51, 61 to seal the exit holes 4, 5, 6, respectively (see FIGS. 2 and 8)

Figure 7:
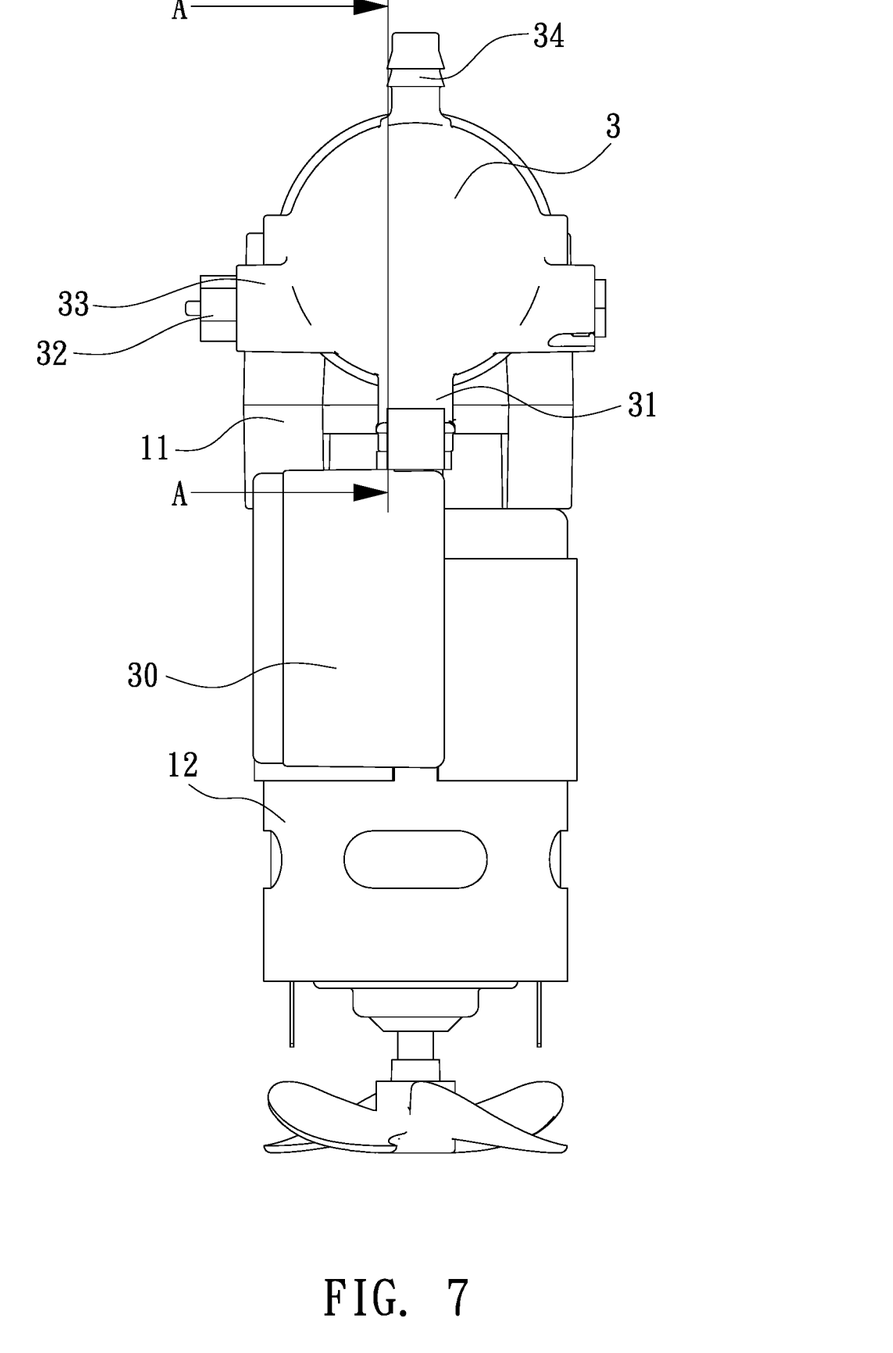
FIG. 7 shows a plan view of the air compressor, wherein an air storage container is assembled onto the cylinder.
Figure 8:
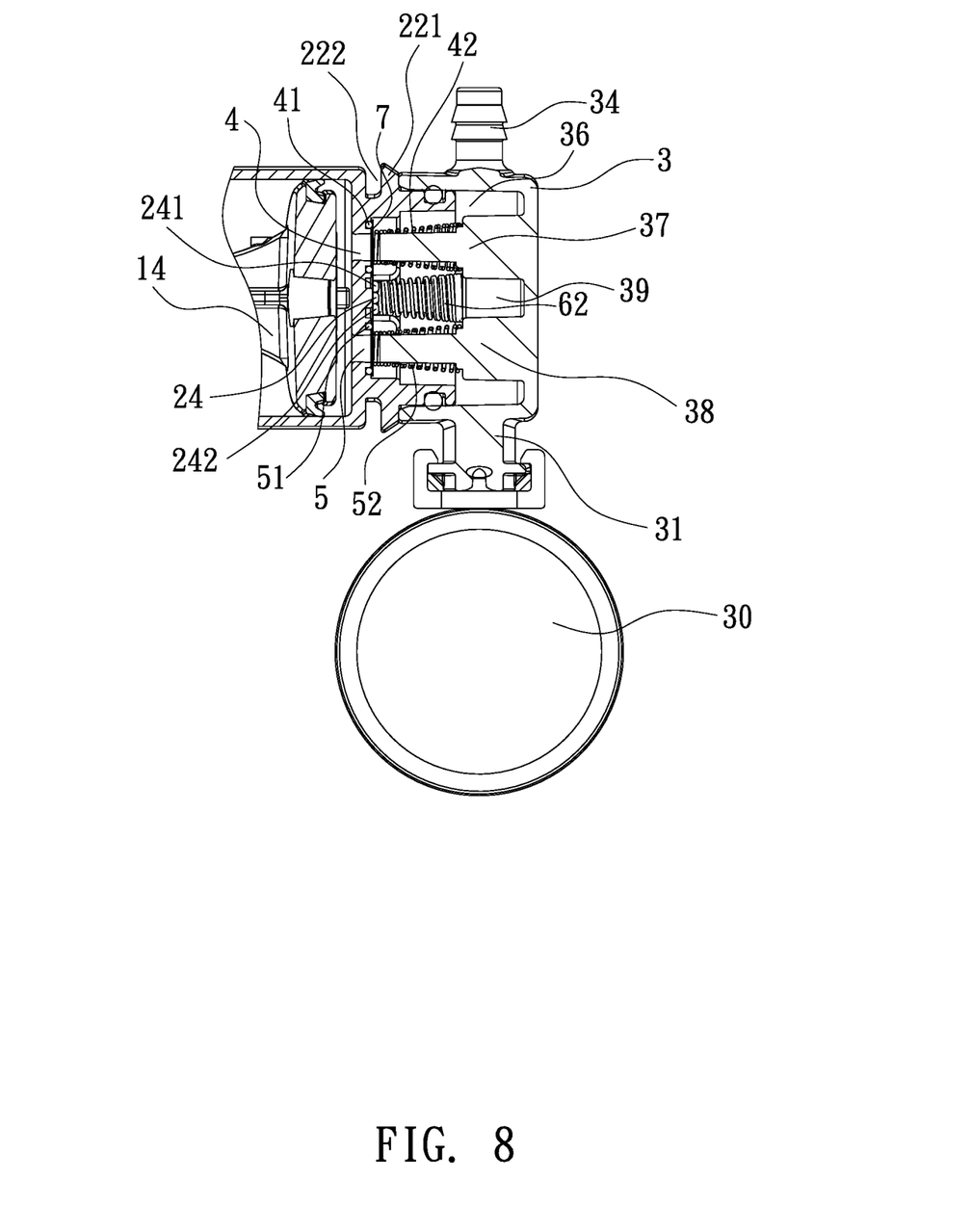
FIG. 8 shows a sectional view of the air compressor taken along line A-A in FIG. 7.
Figure 9:
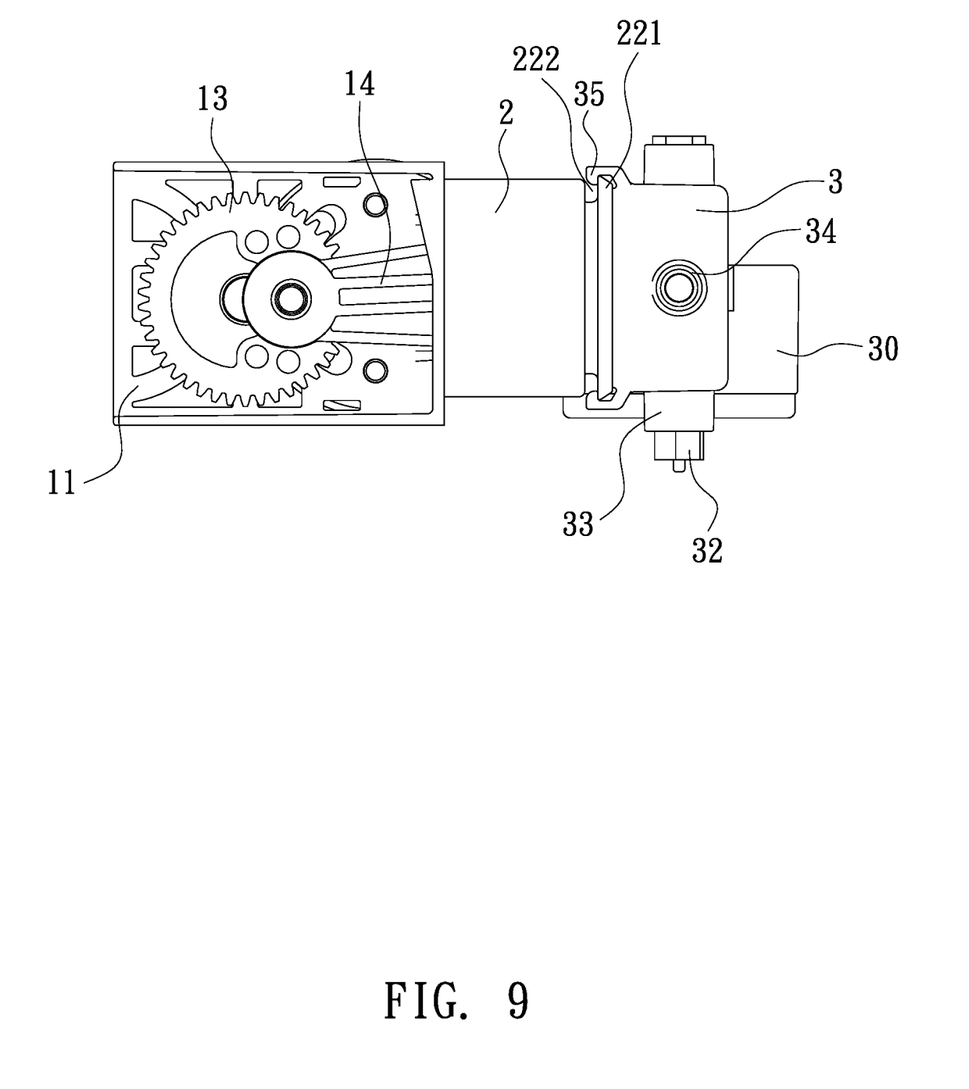
FIG. 9 shows a plan view of the air compressor, wherein a gear and a piston body used in the air compressor are revealed.

Referring to FIGS. 7 and 8, when the piston body 14 conducts reciprocating motion, the compressed air produced in the cylinder 2 can overcome the force of the compression springs 42, 52, 62 exerted on the branches 72, 73, 74 of the resilient sheet 7, thus pushing the branches 72, 73, 74 away from the equal-diameter exit holes 4, 5, 6, respectively, so that the compressed air can flow into the inner space 36 of the air storage container 3. Initially, since the compressed air can flow into the inner space 36 of the air storage container 3 simultaneously via the exit holes 4, 5, 6, the air storage container 3 can be filled with a large amount of air in a short time. Later, since there is a large amount of air having entered the inner space 36 of the air storage container 3, the air contained in the air storage container 3 can exert a greater back force on the branches 72, 73, 74 of the resilient sheet 7 compared to the initial air contained in the air storage container 3. In other words, the piston body 14 may experience greater resistance in conducting reciprocating motion, and this may cause the exit holes 4, 5, 6 more difficult to be opened. However, upon a decrease of the pressure of the air contained in the air storage container 3, the back force exerted on the branches 72, 73, 74 of the resilient sheet 7 will decrease and this allows the compressed air produced in the cylinder 2 to quickly enter the inner space 36 of the air storage container 3. Besides, the first neck portion 722, the second neck portion 732, and the third neck portion 742 are attached to the top wall 21 of the cylinder 2 at separate fixed points, so that each of the branches 72, 73, 74 of the resilient sheet 7 can be moved individually by compressed air without affecting movements of the other branches, so that the piston body 14 can conduct reciprocating motion more smoothly and thus the performance of the air compressor and the speed of inflating an object can be increased.

Figure 6:
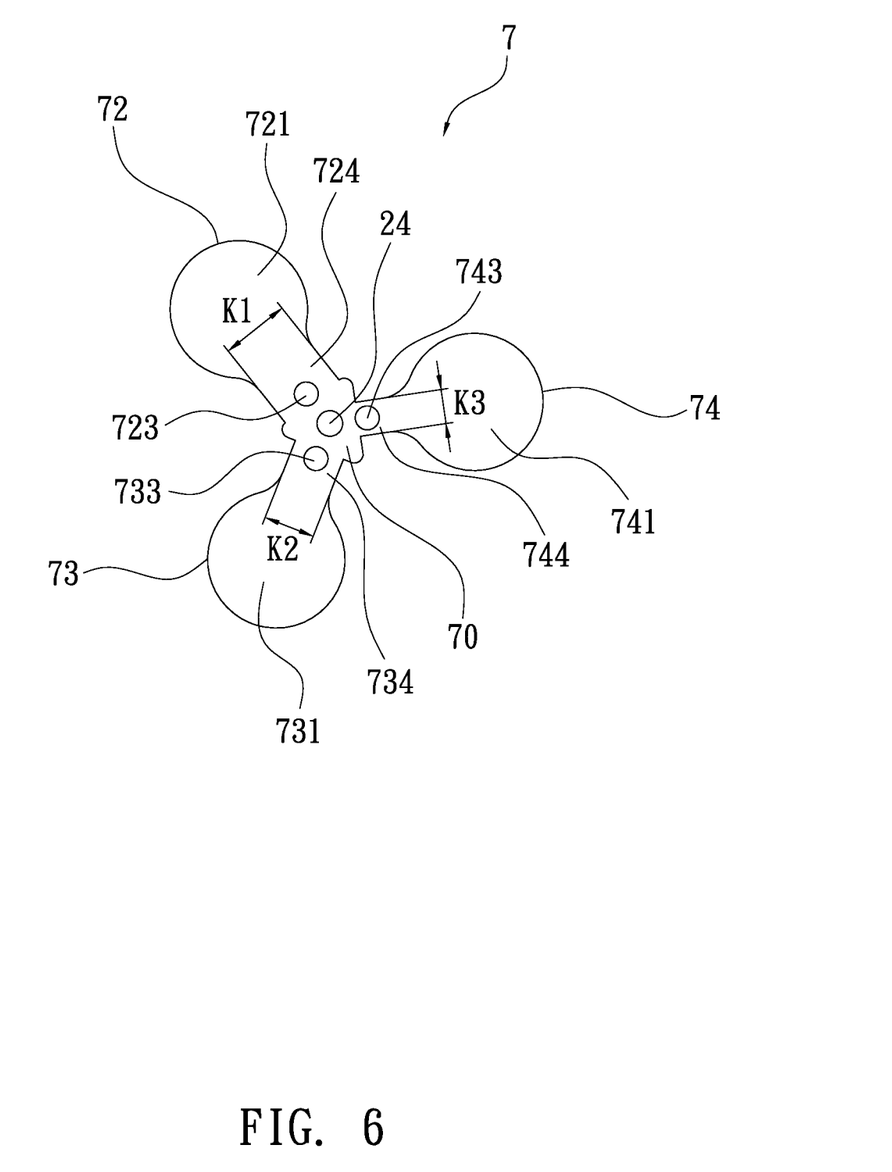
FIG. 6 shows an enlarged plan view of another embodiment of the resilient sheet being used in the present invention.

FIG. 6 shows another embodiment of the resilient sheet, wherein the first leaf 721, the second leaf 731, and the third leaf 741 are configured to have sizes sufficient for covering the exit holes 4, 5, 6; the first neck portion 724, the second neck portion 734, and the third neck portion 744 are configured to have different widths. Specifically, the first neck portion 724 is configured to have a predetermined width K1 being transverse to the extending direction of the first neck portion, the second neck portion 734 is configured to have a predetermined width K2 being transverse to the extending direction of the second neck portion, and the third neck portion 744 is configured to have a predetermined width K3 being transverse to the extending direction of the third neck portion, wherein K1>K2>K3 is fulfilled. Thus, the branches 72, 73, 74 of the resilient sheet 7 provide different elastic forces, wherein the first branch 72 can provide a largest elastic force for sealing the exit hole 4 while the third branch 74 can provide a smallest elastic force for sealing the exit hole 6. As such, the compressed air in the cylinder 2 pushes the third branch 74 away from the exit hole 6 more easily than the other branches of the resilient sheet 7, so that the compressed air enters the inner space 36 of the air storage container 3 via the exit hole 6 as a top priority. Considering the operation of the air compressor as a whole, the piston body 14 can conduct reciprocating motion more smoothly, so that the performance of the air compressor and the speed of inflating an object can be increased.

Figure 10:
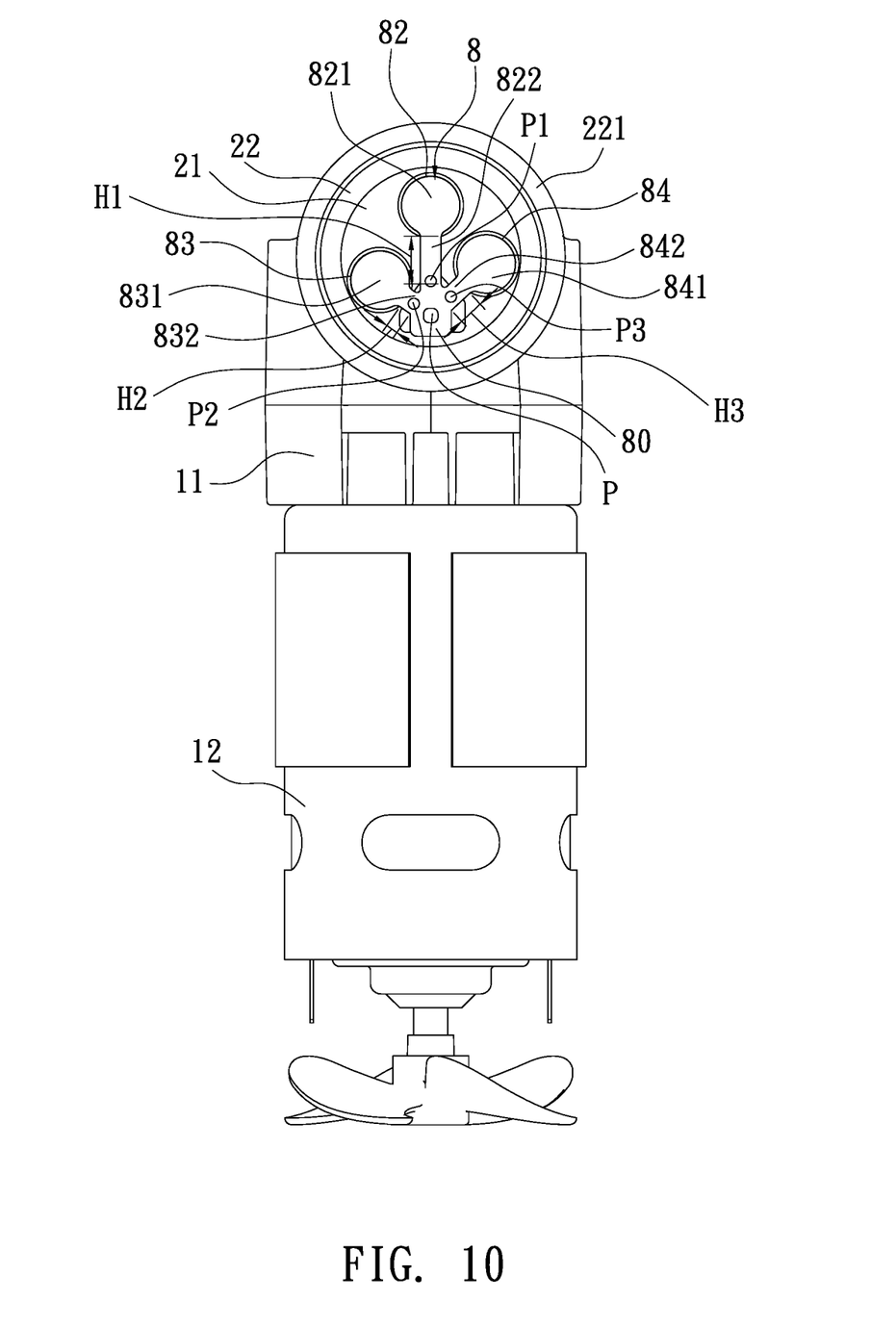
FIG. 10 shows a plan view of an air compressor according to another embodiment of the present invention, wherein a modified embodiment of the resilient sheet is used to seal the exit holes of the cylinder.

FIG. 10 shows another embodiment of the air compressor of the present invention, wherein a modified embodiment of the resilient sheet is used to seal the exit holes of the cylinder. The resilient sheet 8 includes a first branch 82, a second branch 83, and a third branch 84, which correspond to the equal-diameter exit holes 4, 5, 6. The branches 82, 83, 84 extend upwardly from the root 80 to appear as a dendritic configuration. Specifically, the first branch 82 has a first neck portion 822 extending from the root 80 and terminating at a first leaf 821. The second branch 83 has a second neck portion 832 extending from the root 80 and terminating at a second leaf 831. The third branch 84 has a third neck portion 842 extending from the root 80 and terminating at a third leaf 841. The first, second and third leaves 821, 831, 841 of the branches 82, 83, 84 are configured to have sizes sufficient for covering the exit holes 4, 5, 6. In particular, the neck portions 822, 832, 842 of the branches 82, 83, 84 can be configured to extend at different lengths, wherein the first neck portion 822 extends at a predetermined length H1; the second neck portion 832 extends at a predetermined length H2; the third neck portion 842 extends at a predetermined length H3; wherein H1>H3>H2 is fulfilled Thus, the branches 82, 83, 84 of the resilient sheet 8 provide different elastic forces, wherein the second branch 83 provides a largest elastic force for sealing the exit hole 5 while the first branch 82 provides a smallest elastic force for sealing the exit hole 4. As such, the compressed air in the cylinder 2 pushes the first branch 82 away from the exit hole 4 more easily than the other branches of the resilient sheet 8, so that the compressed air enters the inner space 36 of the air storage container 3 via the exit hole 4 as a top priority. Considering the operation of the air compressor as a whole, the piston body 14 can conduct reciprocating motion more smoothly, so that the performance of the air compressor and the speed of inflating an object can be increased.

Figure 11:
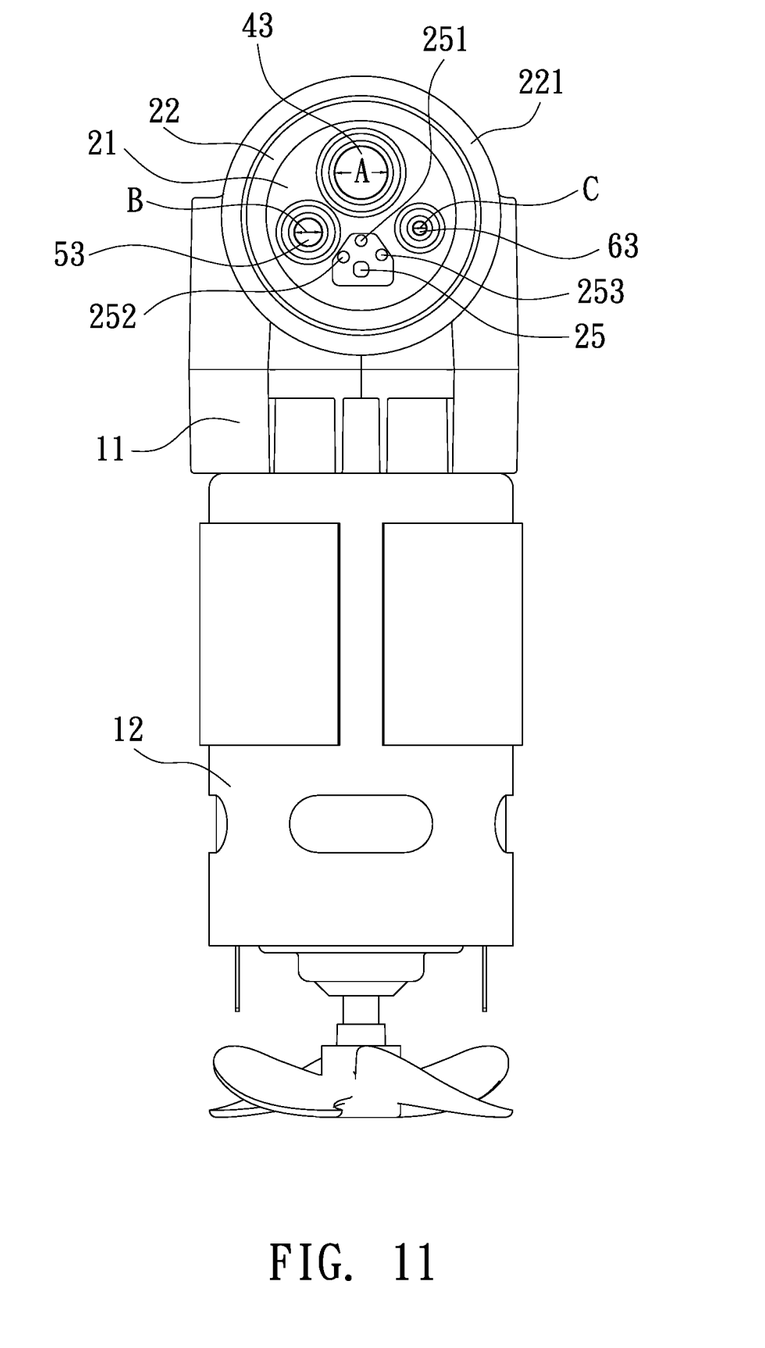
FIG. 11 shows a plan view of an air compressor according to a further embodiment of the present invention, wherein a cylinder thereof defines a plurality of unequal-diameter exit holes.
Figure 12:
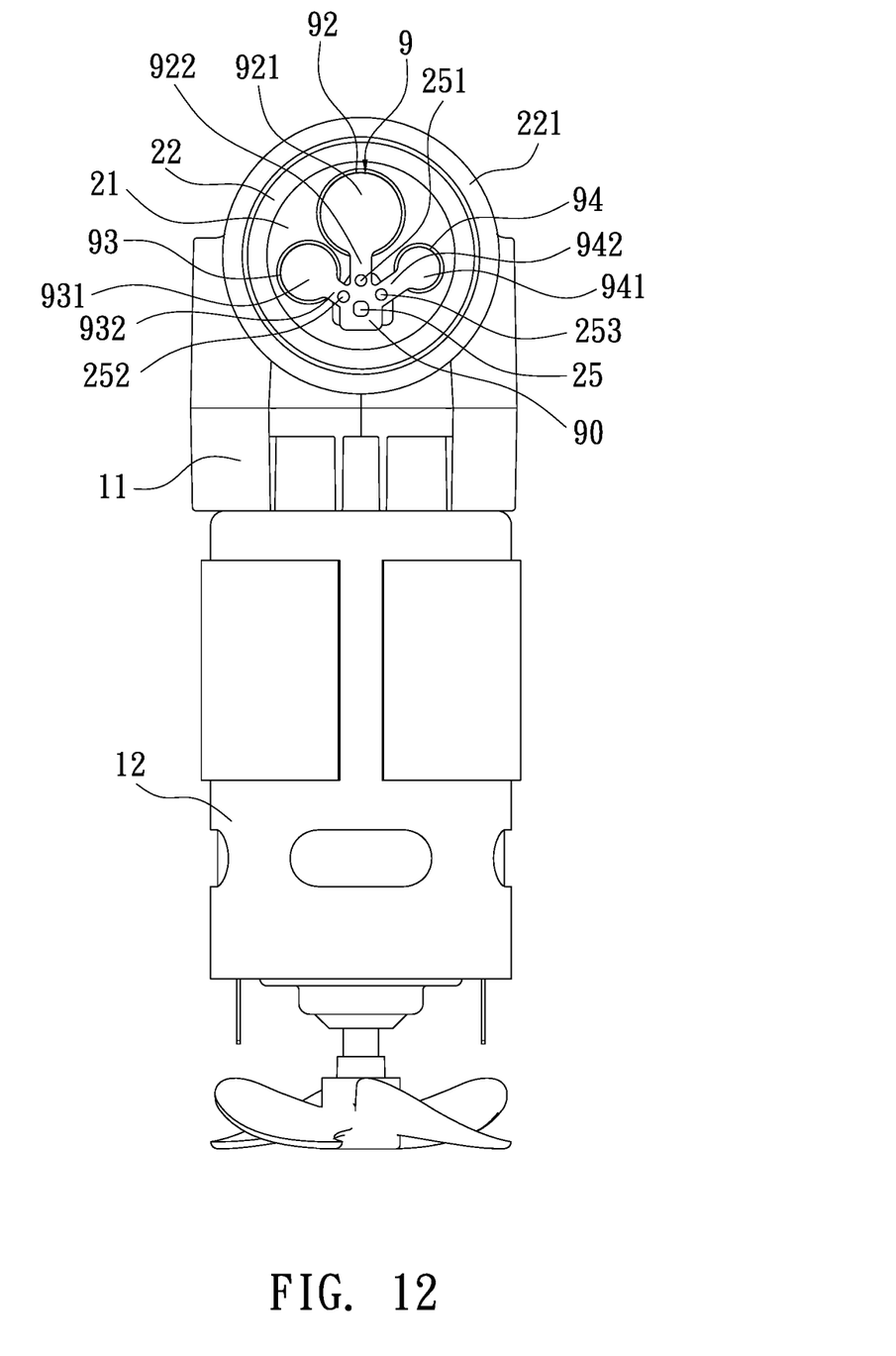
FIG. 12 shows a plan view of the air compressor, wherein a resilient sheet is used to seal the unequal-diameter exit holes shown in FIG. 11.

FIG. 11 shows a further embodiment of the air compressor of the present invention, wherein the cylinder 2 defines at its top wall 21 three exit holes 43, 53, 63 having different diameters. As shown, the exit hole 43 is defined to have a diameter of A; the exit hole 53 is defined to have a diameter of B; the exit hole 63 is defined to have a diameter of C; wherein A>B>C is fulfilled. The exit holes 43, 53, 63 are regulated by a control mechanism to be opened or closed. The control mechanism includes a plurality of O-rings, a plurality of compression springs, and a resilient sheet 9 (see FIG. 12), wherein the resilient sheet 9 includes a first branch 92, a second branch 93, and a third branch 94, which correspond to the exit hole 43, 53, 63. The branches 92, 93, 94 extend upwardly from the root 90 to appear as a dendritic configuration. The first branch 92 has a first neck portion 922 extending from the root 90 and terminating at a first leaf 921. The second branch 93 has a second neck portion 932 extending from the root 90 and terminating at a second leaf 931. The third branch 94 has a third neck portion 942 extending from the root 90 and terminating at a third leaf 941. The first, second and third leaves 921, 931, 941 of the branches 92, 93, 94 are configured to have sizes sufficient for covering the exit holes 43, 53, 63. In particular, the first neck portion 922, the second neck portion 932, the third neck portion 942 can be configured to extend at different lengths. The root 90 and the neck portions 922, 932, 942 each define their positioning holes for being individually attached to the top wall 21, wherein the positioning hole of the root 90 can be fitted over a main boss 25 provided at the top wall 21 of the cylinder 2; the positioning hole of the first branch 92 can be fitted over a first boss 251 provided at the top wall 21 of the cylinder 2; the positioning hole of the second branch 93 can be fitted over a second boss 252 provided at the top wall 21 of the cylinder 2; the positioning hole of the third branch 94 can be fitted over a third boss 253 provided at the top wall 21 of the cylinder 2. As such, the first branch 92, the second branch 93, and the third branch 94 can seal the exit holes 43, 53, 63 respectively.

Figure 13:
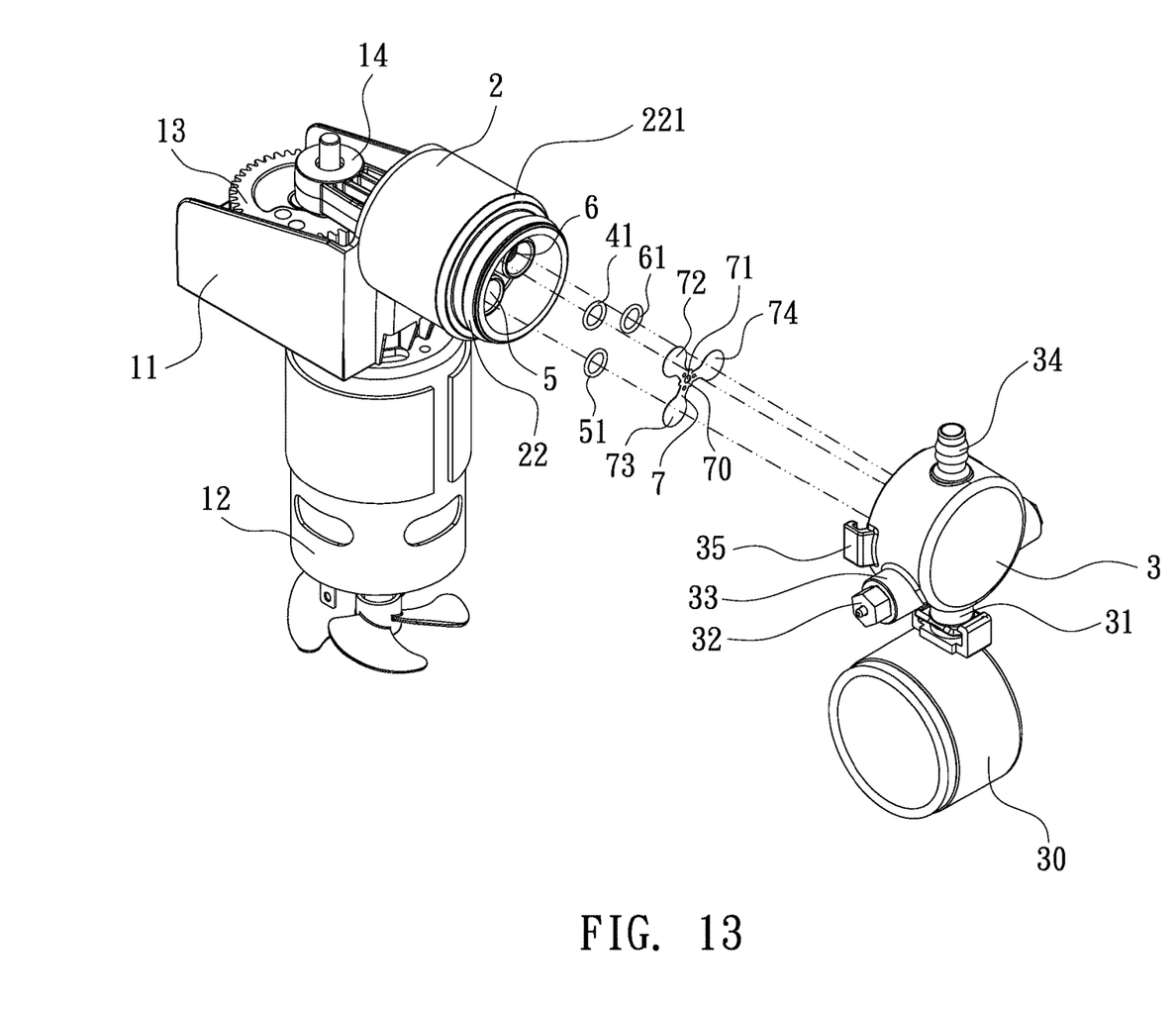
FIG. 13 shows an exploded view of an air compressor according to a still further embodiment of the present invention, wherein compression springs are not included.

In the previous embodiment, as shown in FIG. 2, the branches 72, 73, 74 of the resilient sheet 7 are respectively subjected to the compressive forces of the compression springs 42, 52, 62, so that the branches 72, 73, 74 can seal the exit holes 4, 5, 6 more quickly. Nevertheless, in a still further embodiment of the air compressor, as shown in FIG. 13, the compression springs 42, 52, 62 can be dispensed with; namely, the branches 72, 73, 74 can provide compressive forces by themselves without additional springs to be in tight contact with the O-rings 41, 51, 61, thus sealing the exit holes 4, 5, 6.

As a summary, the air compressor of the present invention has a breakthrough over the prior art in that the top wall 21 of the cylinder 2 defines a plurality of exit holes, which are controlled by the corresponding branches of a resilient sheet to allow the compressed air produced in the cylinder 2 to quickly enter the inner space 36 of the air storage container 3. In addition, since the neck portions 722, 732, 742, 822, 832, 842, 922, 932, 942 of the branches of the resilient sheet are fixed to the top wall 21 at separated points, so that each of the branches of the resilient sheet can be moved individually by compressed air without affecting movements of the other branches, so that the piston body 14 can conduct reciprocating motion more smoothly and thus the performance of the air compressor can be increased. These features render the air compressor of the present invention useful and inventive.

I claim:

1. An air compressor including a main frame for mounting a motor, and a cylinder fitted with a piston body, the motor being configured to drive the piston body to perform reciprocating motion that produces in the cylinder compressed air that is configured to enter an air storage container; wherein the improvements comprise:

the cylinder defines at its top wall three exit holes, which are regulated by a control mechanism to be opened or closed, the control mechanism including a resilient sheet and a plurality of O-rings, the resilient sheet having a root and a plurality of branches extending from the root and corresponding to the exit holes, the O-rings being placed around the exit holes respectively, the resilient sheet being disposed on the top wall of the cylinder such that the root and the branches are fixed at different points, the branches of the resilient sheet having sufficient elastic forces to enable themselves to be in contact with the O-rings to seal the exit holes, respectively, whereby each of the branches of the resilient sheet is individually movable by compressed air without affecting movements of the other branches;

the root of the resilient sheet defines a main positioning hole;

the branches of the resilient sheet includes a first branch, a second branch, and a third branch, the first branch having a first neck portion, which extends from the root and terminates at a first leaf, and defining a first positioning hole at one end of the first neck portion adjacent the root, the second branch having a second neck portion, which extends from the root and terminates at a second leaf, and defining a second positioning hole at one end of the second neck portion adjacent the root, the third branch having a third neck portion, which extends from the root and terminates at a third leaf, and defining a third positioning hole at one end of the third neck portion adjacent the root, the main positioning hole of the root being fitted over a main boss provided at the top wall of the cylinder, the first positioning hole of the first branch being fitted over a first boss provided at the top wall of the cylinder, the second positioning hole of the second branch being fitted over a second boss provided at the top wall of the cylinder, the third positioning hole of the third branch being fitted over a third boss provided at the top wall of the cylinder, the first, second and third leaves being configured to have sizes sufficient for covering respective exit holes.

2. The air compressor of claim 1, wherein the cylinder and the main frame are integrally formed of a plastic material.

3. The air compressor of claim 1, wherein the exit holes are equal in diameter.

4. The air compressor of claim 1, wherein the cylinder has a tubular projection formed on the top wall, the tubular projection provided at its outer surface with a circular flange and defining an annular groove between the circular flange and the top wall; and the air storage container is provided at an outer surface thereof with two coupling means, which are configured for insertion into the annular groove and engage with the circular flange of the cylinder.

5. The air compressor of claim 1, wherein the branches extend from the root at equal angular intervals to appear as a star configuration, the first neck portion is configured to have a predetermined width K1 being transverse to the extending direction of the first branch, the second neck portion is configured to have a predetermined width K2 being transverse to the extending direction of the second branch, and the third neck portion is configured to have a predetermined width K3 being transverse to the extending direction of the third branch, wherein K1>K2>K3 is fulfilled, whereby the compressed air in the cylinder pushes the third branch away from the corresponding exit hole more easily than the other branches of the resilient sheet, so that the compressed air enters the air storage container via the corresponding exit hole of the third branch as a top priority.

6. The air compressor of claim 1, wherein the branches extend at different lengths and different angular intervals from the root to have a dendritic configuration.

7. The air compressor of claim 6, wherein the first neck portion extending for a predetermined length H1, the second neck portion extending for a predetermined length H2, the third neck portion extending at a predetermined length H3, wherein H1>H3>H2 is fulfilled, whereby the compressed air in the cylinder pushes the first branch away from the corresponding exit hole more easily than the other branches of the resilient sheet.

8. The air compressor of claim 1, wherein the exit holes are defined to have different diameters; and the branches extend for different lengths and different angular intervals from the root to appear as a dendritic configuration.

9. An air compressor including a main frame for mounting a motor, and a cylinder fitted with a piston body, the motor configured to drive the piston body to perform reciprocating motion that produces in the cylinder compressed air that is configured to enter an air storage container; wherein the improvements comprise:

the cylinder defines at its top wall a plurality of exit holes, which are regulated by a control mechanism to be opened or closed, the control mechanism including a resilient sheet and a plurality of O-rings, the resilient sheet having a root and a plurality of branches extending from the root and corresponding to the exit holes, the O-rings being placed around the exit holes respectively, the resilient sheet being disposed on the top wall of the cylinder such that the root and the branches are fixed at different points, the branches of the resilient sheet having sufficient elastic forces to enable themselves to be in contact with the O-rings to seal the exit holes, respectively, whereby each of the branches of the resilient sheet are individually movable by compressed air without affecting movements of the other branches; and wherein the control mechanism further includes a plurality of compression springs, which facilitate urging the branches of the resilient sheet against the O-rings to seal the exit holes, respectively;

the air storage container is provided at an inner surface thereof with a plurality of columns corresponding to the branches of the resilient sheet; and each of the compression springs has one end forcing against one of the branches of the resilient sheet, and has another end being fitted at one end of one of the columns, wherein each of the columns is located at a predetermined height above a corresponding branch of the resilient sheet to limit movement of the corresponding branch.

10. The air compressor of claim 9, wherein:

the number of the exit holes is three;

the root of the resilient sheet defines a main positioning hole;

the branches of the resilient sheet include a first branch, a second branch, and a third branch, the first branch having a first neck portion, which extends from the root and terminates at a first leaf, and defining a first positioning hole at one end of the first neck portion adjacent the root, the second branch having a second neck portion, which extends from the root and terminates at a second leaf, and defining a second positioning hole at one end of the second neck portion adjacent the root, the third branch having a third neck portion, which extends from the root and terminates at a third leaf, and defining a third positioning hole at one end of the third neck portion adjacent the root, the main positioning hole of the root being fitted over a main boss provided at the top wall of the cylinder, the first positioning hole of the first branch being fitted over a first boss provided at the top wall of the cylinder, the second positioning hole of the second branch being fitted over a second boss provided at the top wall of the cylinder, the third positioning hole of the third branch being fitted over a third boss provided at the top wall of the cylinder, the first, second and third leaves being configured to have sizes sufficient for covering respective exit holes.

11. The air compressor of claim 10, wherein the branches extend from the root at equal angular intervals to appear as a star configuration, the first neck portion is configured to have a predetermined width L1 being transverse to the extending direction of the first branch, the second neck portion is configured to have a predetermined width L2 being transverse to the extending direction of the second branch, and the third neck portion is configured to have a predetermined width L3 being transverse to the extending direction of the third branch, wherein L1=L2=L3 is fulfilled.

12. The air compressor of claim 11, wherein the cylinder has a tubular projection formed on the top wall, the tubular projection provided at its outer surface with a circular flange and defining an annular groove between the circular flange and the top wall; and the air storage container is provided at an outer surface thereof with two coupling means capable of being inserted into the annular groove and engaged with the circular flange of the cylinder.

13. An air compressor comprising a main frame provided with a motor and a cylinder having a top wall and an open bottom opposite to the top wall, the open bottom fitted therethrough with a piston body, the top wall mounted thereon with an air storage container and defining a plurality of exit holes, which are regulated by a control mechanism to be opened or closed, the control mechanism including a resilient sheet and a plurality of O-rings, the resilient sheet having a root and a plurality of branches extending from the root and corresponding to the exit holes, the O-rings being placed around the exit holes respectively, the resilient sheet being disposed on the top wall of the cylinder such that the root and the branches are fixed at different points, the branches of the resilient sheet having sufficient elastic forces to enable themselves in contact with the O-rings to seal the exit holes, respectively, wherein the motor is configured to drive the piston body to conduct reciprocating motion, which draws outside air into the cylinder via the open bottom and compresses air in the cylinder to enter the air storage container via the exit holes, whereby each of the branches of the resilient sheet is moved by compressed air without affecting movements of the other branches;

wherein the root of the resilient sheet defines a main positioning hole, each branch having a neck portion, which extends from the root and terminates at a leaf, and defining a peripheral positioning hole at one end of the neck portion adjacent the root, the main positioning hole of the root being fitted over a main boss provided at the top wall of the cylinder, the peripheral positioning hole of each branch being fitted over a peripheral boss provided at the top wall of the cylinder, the leaves of the branches being configured to have sizes sufficient for covering respective exit holes.

\* \* \* \* \*